2,953,600
PHENOL-HYDRAZINIUM INNER SALTS

Bernard Rudner, Pittsburgh, Pa., and Marguerite E. Brooks, Baltimore, Md., assignors to W. R. Grace & Co., New York, N.Y., a corporation of Connecticut No Drawing. Filed June 18, 1958, Ser. No. 742,727

14 Claims. (Cl. 260—567.5)

This invention relates to quaternized nitrogen compounds which are also zwitterions. In one specific aspect, it relates to zwitterions of hydrazinium compounds which may be referred to as phenol-hydrazinium inner salts.

In conventional salts the only bond between the charged portions of the molecule is an electrostatic one. In compounds of the inner salt type, dissociation of the ions is not possible because the charged portions of the molecule are held together by covalent bonds. The more general term zwitterion was coined to be descriptive of this situation especially in amino acid chemistry.

We have discovered a method of making a new class of hydrazinium zwitterions to which we have ascribed the name phenol-hydrazinium inner salts. Because of the unusual structure of these compounds, they are quite useful as antioxidants, bactericides, fungicides, nematocides and as intermediates for pharmaceuticals, dye-stffs and polymers.

It is therefore an object of the present invention to provide a novel class of compounds, the phenol-hydrazinium inner salts, and a method for their manufacture.

In accordance with the present invention, it has been discovered that a gaseous of chloramine and ammonia, which may or may not contain nitrogen or another inert gas as a diluent, can be passed into a phenol containing a tertiary amino group to produce new and interesting compounds having the general formula:

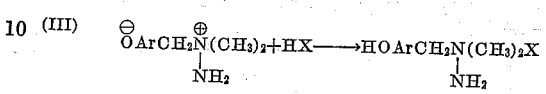

In the above formula, Ar may be phenylene or alkyl, alkoxy, halo and dialkylaminoalkyl substituted phenylenes. R and R' are lower alkyl radicals and $n$ is a whole number less than 5 or 0. When $n=0$, it is understood that the quaternized nitrogen is attached directly to the bivalent phenylene radical.

The invention can be more clearly understood when reference is made to the equations shown hereunder:

(I)
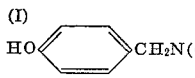

(II)
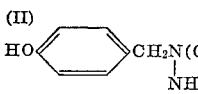
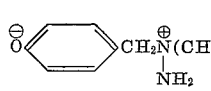

In Equation I, chloramine is seen to react with dimethylaminomethylphenol to produce a trisubstituted hydrazinium chloride. As shown in Equation II, in the presence of excess ammonia, the hydrazinium chloride loses the elements of hydrogen chloride to form the novel phenol-hydrazinium inner salt and ammonium chloride. If excess ammonia is not present, the resulting product is a trisubstituted hydrazinium chloride. As anticipated, acids and bases effect interconversion of the phenol-hydrazinium inner salt and the hydrazinium halide in a general way. The zwitterion will add the elements of an acid to form the corresponding conventional hydrazinium salt as shown in Equation III.

(III) 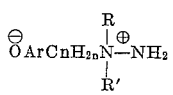

Treatment of the hydrazinium salt with base converts it back to the inner salt which unlike aminophenols does not couple with diazonium salts but gives a wine-red color with ferric chloride. The zwitterions of this invention are soluble in polar organic solvents and dilute acid but are insoluble in dilute base or water.

The most convenient way of making our novel compounds is by the reaction of chloramine with tertiary amines which are also phenols. Chloramine is an excellent reagent economically obtained and commercially available by the process of Sisler et al. described in U.S. Patent 2,710,248 where chlorine and ammonia are reacted in the vapor phase to produce gaseous chloramine. Our novel inner salt producing process worked well under a variety of physical conditions. It may be conducted successfully in anhydrous solution using an excess of the reactant amine as the solvent. The inner salt preparation, like the preparation of other hydrazinium salts, is often facilitated by the use of an inert solvent. The term inert as applied to this solvent is intended to embrace those solvents that do not react preferentially with ammonia, chloramine or the tertiary amine under the reaction conditions employed. A typical unreactive or inert solvent which may be employed for this novel reaction is xylene. Others which are equally effective include other aromatic hydrocarbons, aliphatic hydrocarbons, ethers, dimethylformamide, nitrobenzene and halogenated hydrocarbons such as carbon tetrachloride, trichloroethylene and chlorobenzene. The usual practice of this invention is to pass gaseous chloramine into the phenol-tertiary amine in excess or in the presence of an inert solvent. When gaseous chloramine is used as the reactant, it is necessary to have excess ammonia present as a stabilizer. Nitrogen or other inert gases may be used as diluents but the use of diluents other than ammonia is not essential. When an anhydrous, non-polar solvent such as xylene is used, the phenol-hydrazinium inner salt usually precipitates from solution as it is formed and may be separated readily by filtration. It is obvious to those versed in the art that other methods of effecting this reaction and isolating the resultant product may at times be more convenient but still come within the scope of our invention. For example, the chloramine may be prepared in an inert solvent and then mixed with a solution of the phenol-tertiary amine. In any event, excess ammonia must be present for the novel inner salts of our invention to result directly. In summary, the essence of our invention is the reaction of a phenol-tertiary amine with chloramine in the presence of excess ammonia and the phenol-hydrazinium inner salts produced thereby.

As mentioned previously, the reaction of a phenol-hydrazinium salt with a base produces the corresponding phenol-hydrazinium inner salt. Thus the novel compounds of our invention are available by approaches that do not require the use of chloramine. Any reaction that produces phenol-hydrazinium salts may be used to produce the zwitterion. After the appropriate salt has been synthesized, it is treated with base to remove the elements of an acid with the concurrent formation of the inner salt.

An alternative approach used here was via the hydrazinium sulfate and/or acid sulfate formed by the reaction of hydroxylamine-o-sulfonic acid and a phenol-tertiary amine. The formation of the acid sulfate is illustrated in Equation IV but it makes little difference what sulfate mixture is formed since treatment with base as in Equation V would yield the same inner salt.

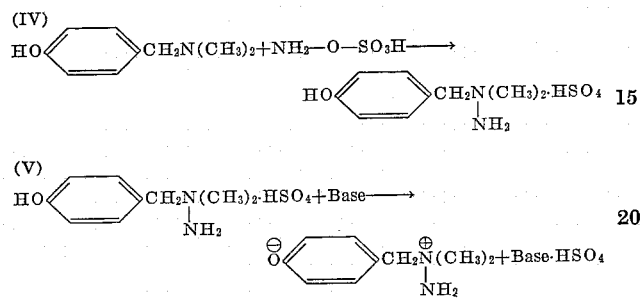

Our invention is further illustrated by the following non-limiting examples:

Example I

A generator was constructed to produce a gaseous chloramine-ammonia mixture using the aforementioned process of Sisler et al. The gas stream was passed into a solution of 41.1 g. of m-diethylaminophenol dissolved in 900 ml. of chloroform. After filtration to remove the 14.6 g. of ammonium chloride formed, the reaction mixture was evaporated to yield a dark purple oil. The residue was slurried with ether at 20° C. and the product, 1,1 - diethyl - 1 - (3 - hydroxyphenyl) - hydrazinium inner salt, was collected by filtration as a hygroscopic water, methyl and isopropyl alcohol soluble solid melting at 38–41° C. The chloride-free product did not couple with a diazonium salt and was insoluble in acetone or benzene but was recrystallized from ethyl alcohol-ethyl acetate to give an off-white hygroscopic solid melting 62–63° C. When a portion of the product was treated with a few drops of concentrated sulfuric acid in dioxane, the corresponding hydrazinium sulfate melting with decomposition at 184° C. resulted. The picrate was also prepared and it melted about 161° C.

Example II

The gas stream of Example I containing about 5 g. of chloramine was passed into a solution of 50 g. of DMP 10 (a commercial mixture of ortho and para dimethylaminomethylphenol) dissolved in 300 ml. of xylene. The resultant precipitate was a hygroscopic brown gum from which starting material and ammonium chloride were removed by trituration with acetone and water respectively. The vacuum dried product was a hygroscopic chloride-free solid melting 103–110° C. soluble in dilute acid but only slowly soluble in water. Treatment of this solid in isopropyl alcohol with dilituric acid gave an immediate precipitate of dimethyl-(4)- and (2)-hydroxybenzylhydrazinium dilituate decomposing ca. 186° C. Evaporation in vacuo of a hydrochloric acid solution of the mixed inner salts gave the highly hygroscopic mixed dimethyl-(4)- and (2)-hydroxybenzyl-hydrazinium chlorides melting at ca. 61–62° C. and again at 121–123° C.

Example III

About 0.2 g. of the inner salts of Example II was dissolved in 10 ml. of N hydrochloric acid and boiled for 30 minutes with 0.2 ml. of 40% formalin. After standing two days, the resultant insoluble polymer was isolated and found useful as an ion exchange resin.

Example IV

Using the chloramine generator of Example I, chloramine was passed into a solution of 50 g. of DMP 30, crude 2,4,6-tris-(dimethylaminomethyl)phenol, dissolved in xylene. The resultant product was a brown hygroscopic gum (similar to the product of Example II) which was identified as the monohydrazinium inner salt. The product mixture was not amenable to resolution.

In a second experiment, the addition of a xylene solution of chloramine to a solution of DMP in the same solvent gave a white solid. The product, however, rapidly turned gummy while being filtered.

Example V

A solution of 14 g. of m-dimethylaminophenol and 11 g. of hydroxylamine-o-sulfonic acid in 70 ml. of methyl alcohol was refluxed several minutes, cooled and filtered. Repeated recrystallization from aqueous methyl alcohol gave two fractions. The more water soluble portion contained hydroxyamine sulfate, ammonium sulfate and free aminophenol. The high melting inner salt was found in the more alcohol soluble portion; it was insoluble in water or dilute base but was soluble in dilute acid. The zwitterion did not couple with benzene diazonium chloride but gave an intense wine-red color with ferric chloride. Evaporation of the product with dilute hydrochloric acid gave the hygroscopic hydrazinium chloride as a crystalline solid melting with decomposition at 163° C. When samples of the inner salt were suspended in separate portions of dioxane containing small amounts of sulfuric, phosphoric and hexafluophosphoric acid, the hydrazinium sulfate, phosphate and fluophosphate respectively were obtained.

Example VI

The inner salt of Example V (50 mg.) was dissolved in 5 ml. of 1:1 acetic acid-acetic anhydride. After standing for two days with occasional shaking, 10 ml. of water was added and the reaction mixture evaporated to dryness at room temperature. There resulted plates of 1,1-dimethyl-1 - (3 - acetoxyphenyl)hydrazinium acetate melting and decomposing ca. 146° C.

Example VII

The mixture of ortho and para dimethylaminomethyl-phenols available commercially under the trade name DMP 10 but described by the manufacturer as being predominately ortho (151 g.) and hydroxylamine-sulfonic-o-sulfonic acid (28.2 g.) were refluxed with stirring in 300 ml. of methyl alcohol until the reaction mixture was negative to starch-iodide paper. After distillation of most of the solvent, the residue was dissolved in water and extracted twice with equal volumes of benzene, made alkaline with excess sodium bicarbonate, extracted four times with equal volumes of benzene, brought to a pH of 2 by the addition of sulfuric acid and finally evaporated to dryness. The residue was continuously extracted with absolute alcohol for 35 hours. The extract was diluted with two volumes of water, treated with charcoal, filtered and evaporated to dryness in vacuo yielding essentially 1,1-dimethyl-1-(2-hydroxybenzyl)hydrazinium sulfate. Recrystallization from mixed methyl and isopropyl alcohol gave white crystals melting 118–122° C. readily soluble in water, dilute acid, dilute base and methyl alcohol. Its chloroplatinate salt melted with decomposition at 213–220° C. When the hydrazinium sulfate was treated with two equivalents of sodium methylate in methyl alcohol, 1,1-dimethyl-1-(2-hydroxybenzyl)-hydrazinium inner salt was obtained as its alcoholate, a hygroscopic oil soluble in chloroform and methyl and isopropyl alcohols but insoluble in ether, benzene, dioxane and aqueous base.

Example VIII

When 13.5 g. of DMP 30 and 8.5 g. of hydroxylamine-o-sulfonic acid were mixed in methyl alcohol, a strongly exothermic reaction occurred. Heating was continued until the reaction mixture was negative to starch-iodide paper. The work up was similar to that of the previous example. After the second series of benzene extractions, the aqueous solution was brought to a pH of 4 by the addition of sulfuric acid and evaporated to about one-fifth its volume. Methyl alcohol was added to precipitate the inorganic sulfates which were removed by filtration. Evaporation of the filtrate yielded 12 g. of the hygroscopic 1,1-dimethyl- 1 - tris - (dimethylaminomethyl)hydroxybenzylhydrazinium sulfate melting 130–135° C. Treatment with base converts it to the corresponding zwitterion.

*Example IX*

A methyl alcohol solution of 12.5 g. of 2-dimethyl-aminomethyl-4-octylphenol and 5.65 g. of hydroxylamine-o-sulfonic acid was allowed to sit at room temperature overnight. Evaporation of the solvent gave the crude 1,1-dimethyl-1-(4-octyl-2-hydroxybenzyl)hydrazinium sulfate. Treatment with base converts it to the corresponding zwitterion.

*Example X*

A methyl alcohol solution of 2.13 g. of hordenine sulfate was treated dropwise with 20% aqueous sodium hydroxide till a pH of 8 was reached. The resultant sodium sulfate was separated by filtration and 2.26 g. of hydroxylamine-o-sulfonic acid in methyl alcohol was added to the reaction mixture which was filtered again and evaporated to dryness. The residue was taken up in aqueous sodium bicarbonate, extracted four times with equal volumes of ether and brought to a pH of 4 with sulfuric acid. The residue obtained on evaporation of the aqueous layer was taken up in methanol. Pouring the solution into excess chloroform resulted in the precipitation of 1,1-dimethyl-1-[2-(4-hydroxyphenyl)ethyl] hydrazinium sulfate, a white hygroscopic solid melting and decomposing about 220° C. Treatment with concentrated aqueous sodium hydroxide resulted in the formation of the corresponding hydrazinium inner salt, a sulfate-free, poorly water soluble solid melting ca. 135° C. with decomposition.

We claim:
1. Compounds having the formula:

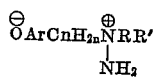

wherein Ar is a divalent aromatic radical selected from the group consisting of phenylene, loweralkylphenylene and diloweralkylaminoloweralkylphenylene; R and R' are lower alkyl radicals; and $n$ is a whole number (including zero) less than five.

2. Compounds according to claim 1 where Ar is the phenylene radical and $n=0$.
3. Compounds according to claim 1 where Ar is the phenylene radical and $n=1$.
4. Compounds according to claim 1 where Ar is the phenylene radical and $n=2$.
5. Compounds according to claim 1 where Ar is a loweralkylphenylene radical and $n=1$.
6. Compounds according to claim 1 where Ar is a diloweralkylaminoloweralkylphenylene radical and $n=1$.
7. 1,1-Diethyl-1-(3-hydroxyphenyl)hydrazinium inner salt.
8. 1,1-Dimethyl-1-(3-hydroxyphenyl)hydrazinium inner salt.
9. 1,1-Dimethyl-1-(2-hydroxybenzyl)hydrazinium inner salt.
10. 1,1-Dimethyl-1-(4-hydroxybenzyl)hydrazinium inner salt.
11. 1,1-Dimethyl-1-[2-(4-hydroxyphenyl)ethyl]hydrazinium inner salt.
12. 1,1-Dimethyl-1-(4-octyl - 2 - hydroxybenzyl)hydrazinium inner salt.
13. 1,1-Dimethyl-1-tris-dimethylaminomethyl)hydroxybenzylhydrazinium inner salt.
14. A method of preparing phenol hydrazinium inner salts having the formula:

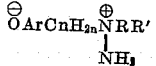

wherein Ar is a member selected from the group consisting of phenylene, loweralkylphenylene, loweralkoxyphenylene, halophenylene and diloweralkylaminoloweralkenephenylene radicals; R and R' are lower alkyl radicals; and $n$ is a whole number (including zero) less than five which comprises contacting a compound having the formula:

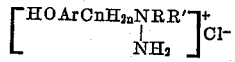

wherein $n$, R, R' and Ar have the values described above, with ammonia and recovering the phenol hydrazinium inner salt thus formed from the reaction mixture.

References Cited in the file of this patent

Omietanski et al.: Journal-American Chemical Society, vol. 78, pp. 1211–1213 (1956).